United States Patent
Swanborn (12) 
(10) Patent No.: US 6,702,877 B1
(45) Date of Patent: Mar. 9, 2004

(54) APPARATUS AND METHOD FOR PROCESSING OF A MIXTURE OF GAS WITH LIQUID AND/OR SOLID MATERIAL

(75) Inventor: Rombout Adriaan Swanborn, Arnhem (NL)

(73) Assignees: Spark Technologies and Innovations N.V., Curacao (AN); Koch-Glitsch N.V., Curacao (AN)

(*) Notice: Subject to any disclaimer, the term of this patent is extended or adjusted under 35 U.S.C. 154(b) by 0 days.

(21) Appl. No.: 10/009,105
(22) PCT Filed: May 6, 2000
(86) PCT No.: PCT/NL00/00382
§ 371 (c)(1), (2), (4) Date: May 6, 2002
(87) PCT Pub. No.: WO00/74815
PCT Pub. Date: Dec. 14, 2000

(30) Foreign Application Priority Data

Jun. 4, 1999 (NL) .............................................. 1012245

(51) Int. Cl.[7] .............................................. B01D 45/12
(52) U.S. Cl. .............................. 95/269; 55/416; 55/421; 55/428; 55/457; 96/189
(58) Field of Search .............................. 95/269; 55/416, 55/421, 428, 457; 96/188, 189

(56) References Cited

U.S. PATENT DOCUMENTS

| 2,936,043 A | * | 5/1960 | Armstrong et al. | ........... 55/451 |
| 3,590,558 A | * | 7/1971 | Fernandes | ..................... 55/338 |
| 4,187,088 A | | 2/1980 | Hodgson | ..................... 96/171 |

FOREIGN PATENT DOCUMENTS

| DE | 2925245 | 1/1980 |
| EP | 0436973 | 7/1991 |
| FR | 2584944 | 1/1987 |

* cited by examiner

Primary Examiner—Robert A. Hopkins
(74) Attorney, Agent, or Firm—Webb Ziesenheim Logsdon Orkin & Hanson, P.C.

(57) ABSTRACT

Disclosed device for separating a mixture of gas with liquid and/or solid, which comprises a gravity separation vessel and a processing vessel which can be mounted in the gravity separation vessel. The processing vessel comprises a flow body which is provided with one or more swirl elements which set the feed mixture into rotation. The processing vessel also comprises a resistance element which is positioned between an outlet for the heavier fraction of the mixture and the flow body. The processing vessel may also comprise counter-swirl elements which are positioned in the discharge channel for the lighter fraction of the mixture.

23 Claims, 5 Drawing Sheets

APPARATUS AND METHOD FOR PROCESSING OF A MIXTURE OF GAS WITH LIQUID AND/OR SOLID MATERIAL

BACKGROUND OF THE INVENTION

1. Field of the Invention

The present invention relates to an apparatus and method for processing of a mixture of gas with liquid and/or solid material.

2. Description of the Related Art

Known are gravity separation vessels, also referred to as two or three phase separators, for separating mixtures of respectively gas with a liquid or gas with a light and a heavy liquid. As a result of the action of the force of gravity the gas is collected at the top of the gravity separation vessel, while the liquid is collected at the bottom of the vessel, wherein the light liquid remains floating on the heavy liquid. This provides the possibility of separating the mixture.

A device is also known which is constructed from a gravity separation vessel in which one or more inlet devices are arranged. With such inlet devices a pre-treatment can be carried out on the supplied mixture before the mixture is separated in the above described manner. Such inlet devices have as most important functions the reduction of the impact of the inlet flow so that the degree of separation inside the gravity separation vessel can be maximized, preventing liquid shattering whereby small liquid droplets could result which would make the separation process more difficult, and prevention of so-called "foaming", or the occurrence of foam.

These inlet devices have a number of drawbacks however. A first drawback is that since the liquids and the gases are discharged from different outlets, both outlets can have different pressure drops, with the result that gas can flow out of the liquid outlet and/or liquid out of the gas outlet. A second problem is that the discharge of gas can be obstructed by an increase in the quantity of liquid in the inlet device.

SUMMARY OF THE INVENTION

The object of the present invention is to provide a device and method wherein the above stated drawbacks are obviated and wherein the liquid level is situated at a suitable height in the inlet device (processing vessel).

According to a first aspect of the invention a device is provided for separating a mixture of gas with liquid and/or solids, comprising:

- a gravity separation vessel which is provided with an inlet for the supply of the mixture;
- a processing vessel which can be mounted in the gravity separation vessel and connected to the inlet, which processing vessel comprises a first and second outlet opening for the discharge of respectively a first mixture part and a second mixture part to a space of the gravity separation vessel for further separation of the second mixture part;
- a flow body arranged substantially concentrically in the processing vessel and provided with one or more swirl elements for setting the supplied mixture into swirling movement;
- a discharge channel for discharging the first mixture part to the first outlet opening, which discharge channel is arranged substantially through the interior of the flow body and extends from the downstream side of the flow body to the first outlet opening;
- a resistance element with a predetermined flow resistance arranged between the second outlet opening and the flow body. By setting the supplied mixture into rotation a change in pressure can be realized in the processing vessel with which the pressure balance in the processing vessel can be preadjusted.

A device is per se known from European patent application EU 0436973 A2 wherein a supplied mixture of gas with liquid and/or gas with solids is set into swirling movement in a vessel by a swirl element, which swirling generates centrifugal forces in the mixture whereby a first mixture part consisting substantially of liquid or solids is pressed against the wall of the processing vessel, while a second mixture part consisting substantially of gas moves to the middle of the processing vessel. The second mixture part is discharged in the known device via a discharge pipe at the top of the vessel, while the second mixture part is discharged via a discharge pipe at the bottom of the vessel. The known device is however of an entirely different type and is not suitable for carrying out a pretreatment in a gravity separation vessel in which the mixture parts, once they have been discharged, remain in open connection in (a space of) the gravity separation vessel for the purpose of a further treatment.

According to a preferred embodiment the device comprises one or more first counter-swirl elements arranged in the discharge channel for reducing the swirling movement of the first mixture part, downstream of which the first outlet opening is arranged. By arranging a counter-swirl element in the discharge channel to reduce the swirling movement of the first mixture part, the pressure drop over the discharge channel is decreased whereby the discharge of the first mixture part through the discharge channel is improved. This moreover prevents the first mixture part being entrained by the second mixture part and exiting to the outside through the second outlet opening.

According to a further preferred embodiment the resistance element comprises one or more second counter-swirl elements for reducing the swirling movement of the second mixture part. The pressure balance, and therewith the height of the second mixture part (liquid) in the processing vessel, can be further adjusted with the second counter-swirl element.

According to another aspect of the invention a device is provided for separating a mixture of gas with liquid and/or solids, comprising:

- a gravity separation vessel which is provided with an inlet for the supply of the mixture;
- a processing vessel which can be mounted in the gravity separation vessel and connected to the inlet, which processing vessel comprises a first and second outlet opening for the discharge of respectively a first mixture part and a second mixture part to a space of the gravity separation vessel for further separation of the second mixture part;
- a flow body arranged in the longitudinal direction of the processing vessel;
- a discharge channel for discharging the first mixture part which is arranged substantially through the interior of the flow body and extends from the downstream side of the flow body to the first outlet opening;
- a resistance element with a predetermined flow resistance which is arranged between the second outlet opening and the flow body, wherein the resistance element comprises one or more counter-swirl elements. Using a resistance element embodied in such a manner the pressure in the processing vessel can be preadjusted to a value which is appropriate under the conditions of use by a correct placing and dimensioning of the plates and the orientation thereof relative to each other.

The device preferably comprises one or more first counter-swirl elements arranged in the discharge channel for reducing the swirling movement of the first mixture part, downstream of which the first outlet opening is arranged.

According to yet another aspect of the invention a device is provided for separating a mixture of gas with liquid and/or solids, comprising:

a gravity separation vessel which is provided with an inlet for the supply of the mixture;

a processing vessel which can be mounted in the gravity separation vessel and connected to the inlet, which processing vessel comprises a first and second outlet opening for the discharge of respectively a first mixture part and a second mixture part to a space of the gravity separation vessel for further separation of the second mixture part;

a flow body arranged in the longitudinal direction of the processing vessel;

a discharge channel for discharging the first mixture part arranged substantially through the interior of the flow body and extending from the downstream side of the flow body to the first outlet opening;

one or more first counter-swirl elements arranged in the discharge channel for reducing the swirling movement of the, first mixture part, downstream of which the first outlet opening is arranged;

a resistance element with a predetermined flow resistance arranged between the second outlet opening and the flow body.

According to a preferred embodiment a swirl element comprises one or more preferably curved swirling blades, wherein the swirling blades are formed for setting into swirling movement or at least increasing the swirling movement of the mixture or mixture part flowing therealong, while a counter-element preferably comprises one or more preferably curved swirling blades, wherein the swirling blades are formed for decreasing the swirling movement of the mixture or mixture part flowing therealong. Through a correct choice of the curvature the swirling speed of the mixture flowing therealong, and therewith the pressure drop over the swirl element, can be modified.

It is noted that this curvature can vary. When for instance the curvature of a swirling blade increases in flow direction, the mixture flowing therealong will then undergo an increasingly more rapid swirling movement. Conversely, a mixture flowing along a swirling blade with decreasing curvature undergoes an increasingly slower swirling movement.

According to a further preferred embodiment the processing vessel comprises an inner jacket which comprises a conically tapering part in flow direction, in order to obtain a uniform flow of the first mixture part along the inner jacket.

According to a further preferred embodiment the components of the processing vessel are embodied such that they can be fed through a manhole in the gravity separation vessel. The greatest dimension of a component is herein a maximum of 150 cm. By constructing the processing vessel from such relatively small components it is possible to arrange the processing vessel in already existing gravity separators.

According to a further aspect of the present invention a method is provided for designing, a separation vessel for separating a mixture into a light and heavy fraction, wherein the processing vessel comprises an inlet for the mixture, a first outlet for the light fraction and a second outlet for the heavy fraction, in addition to rotation means for setting the mixture into rotation, wherein swirl elements arranged close to the inlet and/or counter-swirl elements arranged close to the first and second outlet are provided with swirling blades dimensioned such that through the desired degree of rotation a pressure is available in the separation vessel for separating the mixture in as optimal a manner as possible.

By designing the rotation means or the counter-rotation means in correct manner in accordance with fluid dynamic principles the desired rotation of the mixture as well as the desired pressure drop over such a separation vessel can be preselected in accordance with the conditions, since the boundary surface between the heavy and light fraction extends in as optimal a manner as possible in the separation vessel.

BRIEF DESCRIPTION OF THE DRAWINGS

Further advantages, features and details of the present invention will become apparent in the light of the following description of preferred embodiments thereof. Reference is made herein to the annexed drawings, in which.

DETAILED DESCRIPTION OF THE PREFERRED EMBODIMENTS

Figure 1:
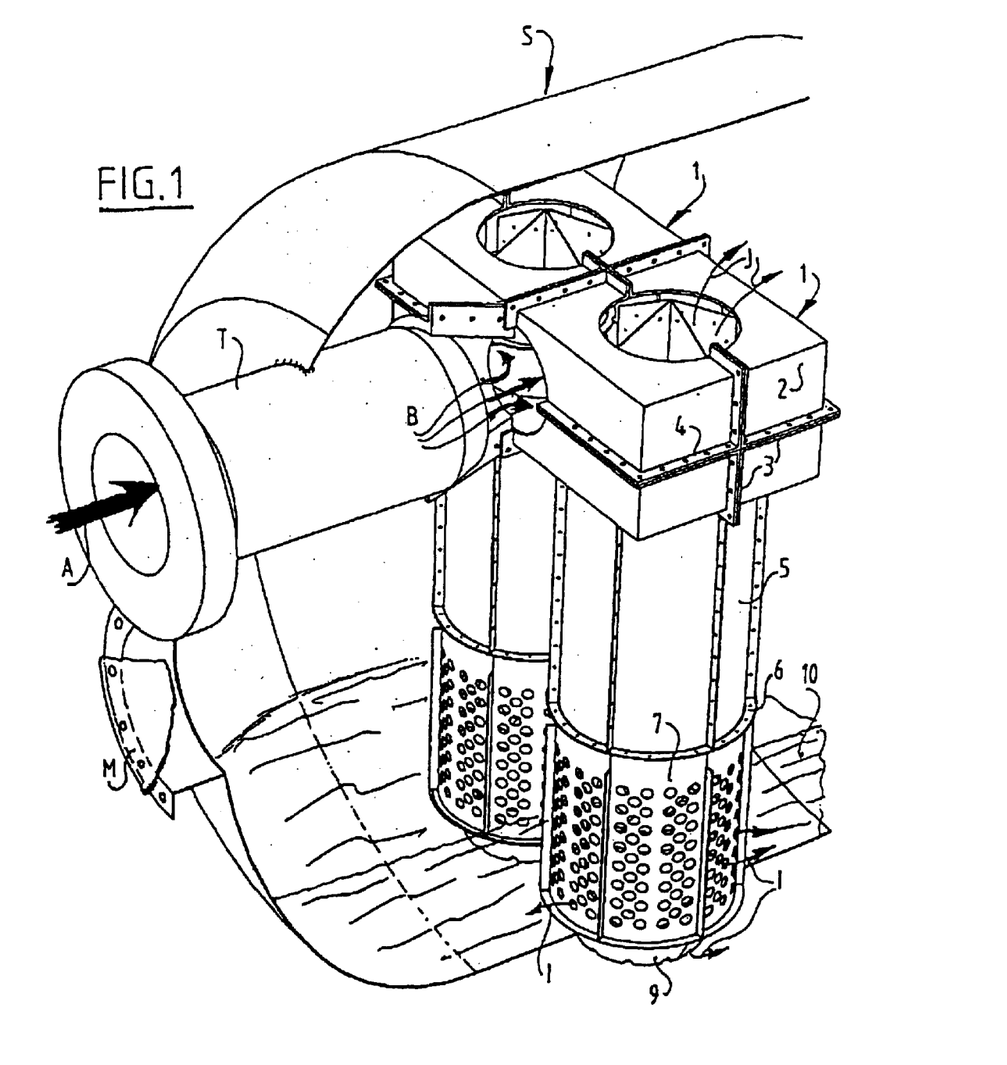
FIG. 1 shows a partly cut-away perspective view of a gravity separator which is provided with two devices according to a preferred embodiment of the invent ion.

FIG. 1 shows a gravity separation vessel S much used in the offshore industry. Via a supply channel t a mixture of gas and liquid is supplied in the direction of arrow a and then separated under the influence of gravity. The mixture is separated into a mixture part with a high gas content (light fraction) and a mixture part with a low gas content (heavy fraction). Separation of the heavy fraction (water and oil) moreover occurs in a fraction with substantially water and a fraction with substantially oil, wherein the lighter oil remains floating on the heavier water. The separation of the layers of water and oil further takes place in a manner known to the skilled person and in order to simplify the description is not further explained here.

In order to improve the operation of such (gravity) separation vessels, there are, as already stated above, inlet devices known in a number of applications in the oil and gas-processing industry which carry out a pretreatment on the supplied mixture before further separating the mixture in known manner. Such inlet devices have as most important functions the reduction of the impact of the inlet flow so that the degree of separation inside the separating vessel S can be maximized, preventing liquid shattering whereby small liquid droplets could result which make the separating process more difficult, and prevention of so-called "foaming", or the occurrence of foam, A particular embodiment of inlet devices is formed by so-called inlet cyclones wherein the liquids and gases undergo a first separation under the influence of centrifugal forces generated in the inlet cyclone. The thus separated mixture parts come to lie in the remaining part of the gravity separation vessel S, wherein the heavy fraction is formed at the bottom of the vessel S and the light fraction ac the top of the vessel S.

The mixture of liquid and gas supplied via supply cube t is guided into one of the inlet cyclones 1. In the shown embodiment two inlet cyclones 1 are arranged mutually adjacently. Embodiments are however also possible with only one inlet cyclone or with more than two inlet cyclones which are placed adjacently of each other or in other random order relative to each other. Arrow b in FIG. 1 indicates that the mixture flows to the right-hand inlet cyclone 1. The mixture could equally well flow to the left-hand inlet cyclone 1 and be treated in the same manner since the left-hand inlet cyclone is identical to the right-hand inlet cyclone. However, for the sake of clarity of the description only the operation of the right-hand inlet cyclone 1 will be described below.

Figure 2:
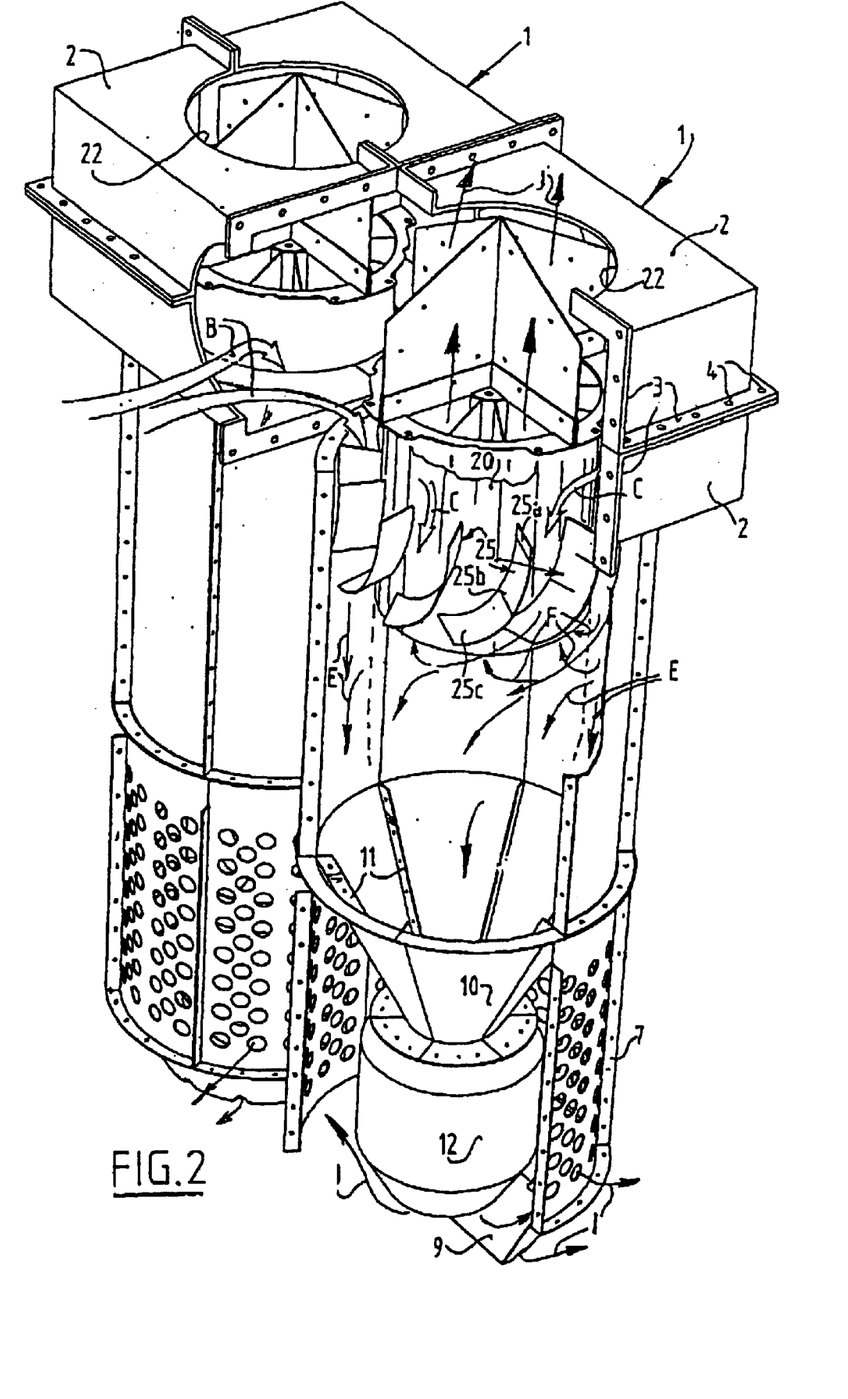
FIG. 2 shows a partly cut-away perspective view of the preferred embodiment of FIG. 1.

The mixture enters inlet cyclone 1 (arrow b) in a chamber 2 which is formed from four parts which are provided with flanges 3 and fixed to each other using fixing means 4. The mixture subsequently flows (arrow c) downwards between a substantially cylindrical outer jacket 5 and a substantially cylindrical flow body 20 arranged concentrically relative to outer jacket 5. At one end the flow body 20 protrudes some distance into the space enclosed by outer jacket 5, while at the other end the flow body 20 extends up to an upper wall 22 of chamber 2.

Figure 5:
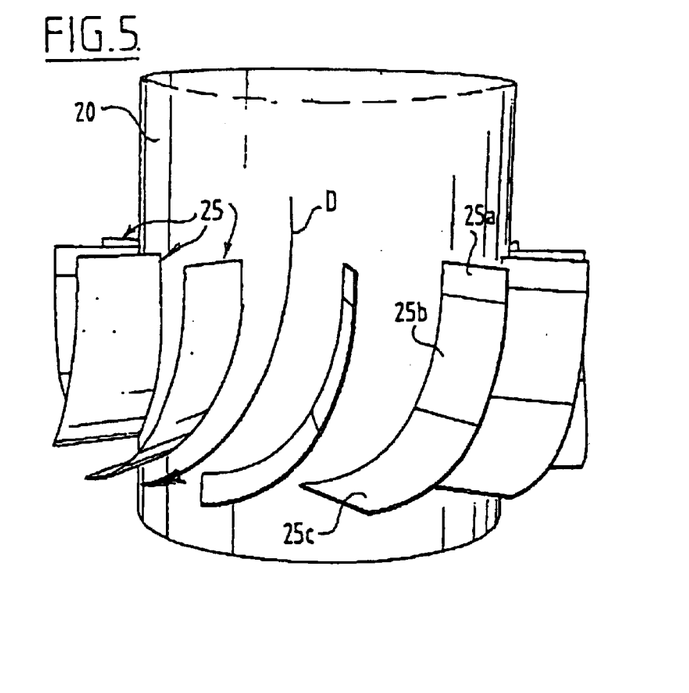
FIG. 5 shows a view in perspective of a preferred embodiment of the swirl element arranged concentrically in the processing vessel.

On the outer surface of flow body 20 are arranged a number of curved swirling blades 25 which cause a swirling of the mixture flowing therealong.

Such a swirling blade 25 is constructed from a first part 25a, a second part 25b and a third part 25c which are formed such that a swirling blade 25 has an increasing curvature, i.e. the curvature of part 25b is greater than that of 25a, while the curvature of 25c is greater than that of 25b. The flowing mixture is hereby set into increasingly quicker rotation (arrow d)

As a result of the centrifugal forces the heavy fraction of the mixture, i.e. substantially liquid, is pressed against the inner side of outer jacket 5 and transported downward (arrow e) in the region along the outer jacket 5, while the light fraction of the mixture, i.e. substantially gas, comes to lie in the central region of the space enclosed by outer jacket 5 (arrow f).

Outer jacket 5 is provided with a flange 6 which connects onto a perforated jacket 7. Flange 6 also connects onto a conically tapering or funnel-shaped component 10 which is provided on the inner side with six vertical ribs 11.

The heavy fraction then enters a resistance element (arrow g) which decreases the swirling thereof and with which the pressure in the space enclosed by outer jacket 5 is increased. The embodiment of such a resistance element will be described at a later stage.

The heavy fraction subsequently flows from the underside through an exit opening to the outside and enters a tray-like component 9 which is fixed against the lower edge of the perforated jacket 7. The heavy fraction (v) then flows to the outside via the perforations in perforated plate 7 (arrow i, FIG. 1) and enters a part of the gravity separator 5 for a further separating treatment. A uniform velocity distribution of the heavy fraction exiting to the outside is effected by arranging such a perorated plate 7, which enhances the separation of the mixture of oil in water into a layer of water with oil floating thereon.

The pressure caused by resistance element 12 in the space enclosed by outer jacket 5 ensures that the light fraction is driven in the direction of arrow f into a discharge channel provided in the interior of flow body 20. The light fraction is then discharged in the direction of arrow h.

If however there is too great a pressure drop in the discharge channel it is possible that the gas, instead of being transported through the discharge channel, is entrained by the liquid flow (arrow e). This reduces the separating action of inlet cyclone 1.

In order to reduce the pressure drop in the discharge channel formed in flow body 20 a counter-swirl element is therefore arranged in the discharge channel.

Figure 3:
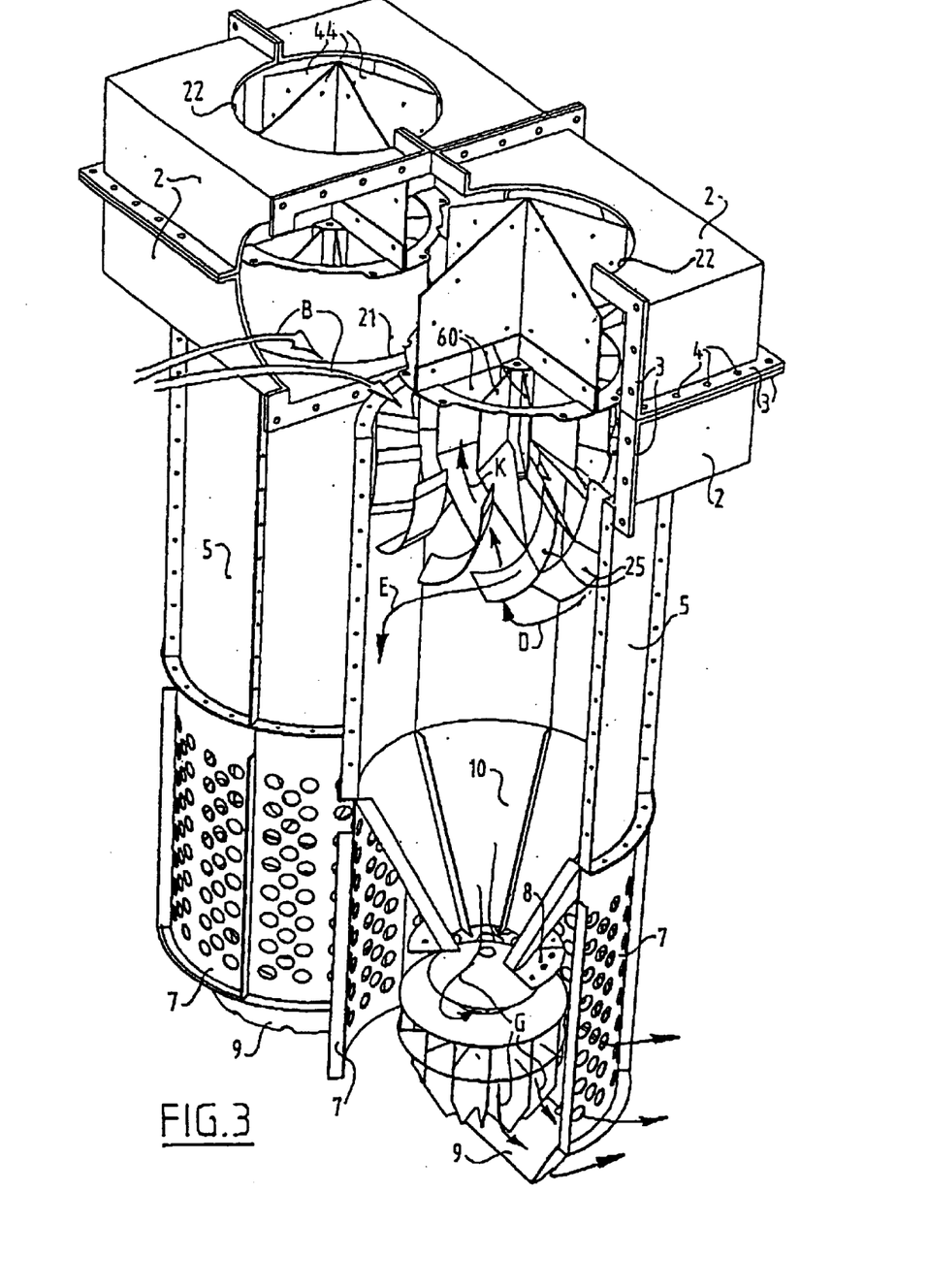
FIG. 3 shows a further elaborated perspective view of the preferred embodiment of FIG. 2.
Figure 4:
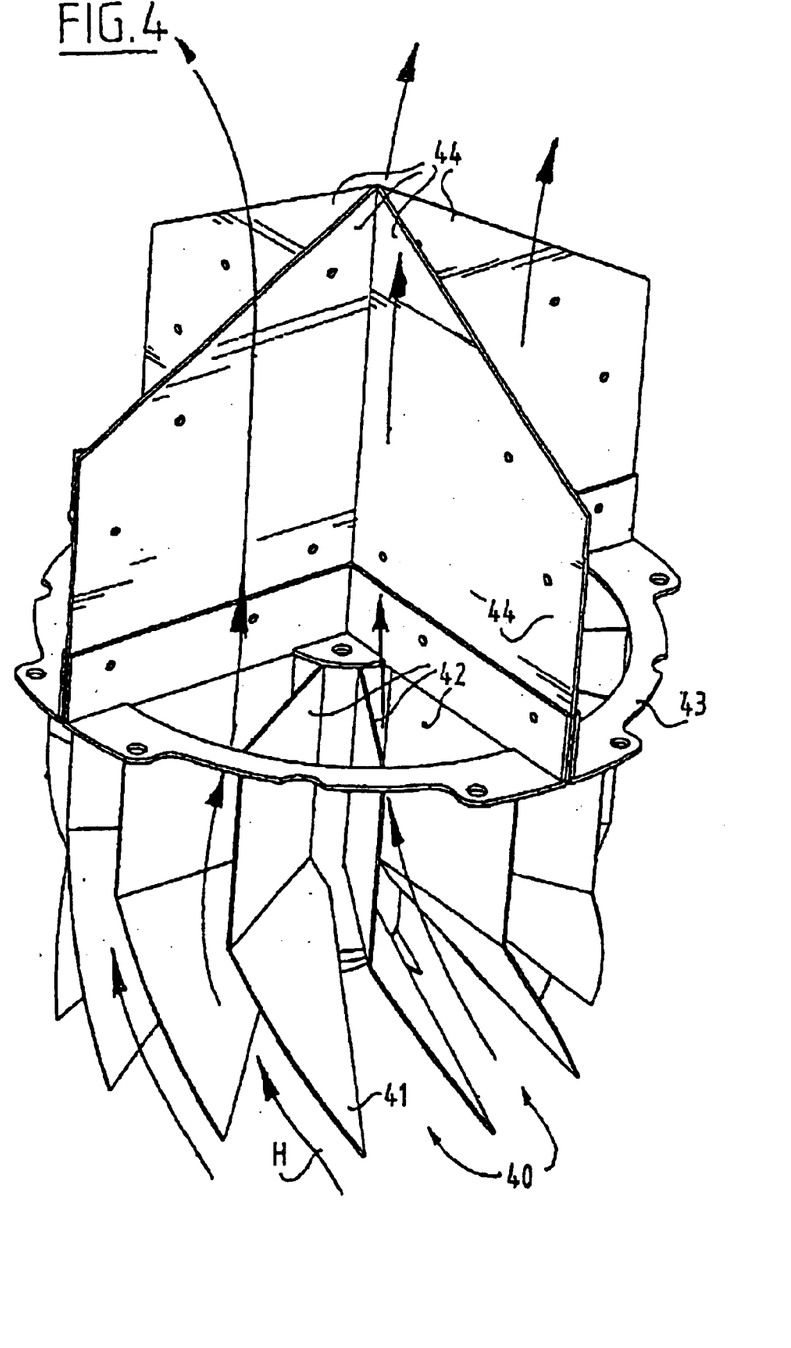
FIG. 4 shows a view in perspective of a preferred embodiment of the counter-swirl element in the discharge channel.

FIG. 4 shows a preferred embodiment of such a counter-swirl element 60. The light fraction flows through the discharge channel in the direction of arrow h, swirling in the meantime as a consequence of the above mentioned swirling blades 25. This swirling is impeded in that the light fraction is guided (arrow k in FIG. 3) along a counter-swirl element 60 formed by a number of swirling blades which each consist of a first swirling blade part 41 and a second swirling blade part 42, wherein swirling blade parts 41 and 42 make an angle a relative to the longitudinal axis of the discharge channel such that the initially rapidly swirling light traction is gradually caused to swirl less rapidly. The angle a can vary in practice between 0 and 80 degrees, subject to the application.

The swirling blades are connected by means of a connecting piece 43 to upright plates 44 which are placed in substantially intersecting position relative to each other and which further limit the swirling movement of the light fraction. The pressure drop over the discharge channel is reduced by such a gradual decrease in the swirling movement of the light fraction.

The light fraction then exits to the outside (arrow j), and enters a part of the gravity separator where further separation of the heavy fraction will take place.

Figure 6:
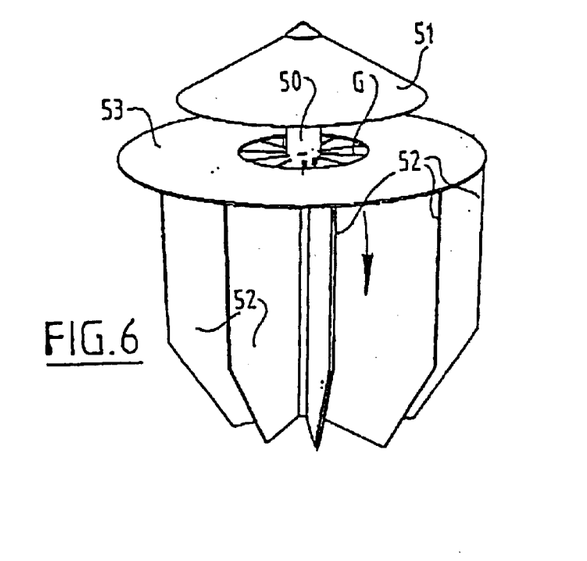
FIG. 6 shows a view in perspective of a preferred embodiment of a resistance element according to the invention.

FIG. 6 shows a preferred embodiment of a resistance element, wherein for the sake of clarity the outer jacket 12 of the resistance element is omitted. The resistance element is constructed from a central core 50, on the top side of which is mounted a conical component 51 which becomes wider in the flow direction. A number of flat places 52 extending in a fan shape in the length direction is moreover arranged on central core 50. These flat plates 52 limit the rotation of the mixture part flowing therealong in the direction of arrow 5, whereby a corresponding change in pressure occurs over the resistance element. The pressure balance in the processing vessel can hereby be adjusted.

In an embodiment which is not shown, a number of transverse plates are arranged on the outer jacket 12 and the longitudinal plates 52, this such that an opening is provided around core 50 along which liquid can flow. A transverse plate is moreover arranged on central core 50 which has a diameter such that between the peripheral edge thereof and outer jacket 12 there is an interspace along which the liquid can flow.

Owing to the above described construction the downward flowing heavy fraction will flow downward via the opening in the first transverse plate, the interspace between the second transverse plate and outer jacket 12 and the opening in the third transverse plate. With a correct embodiment of the openings, the number of plates, the form of the plates etc., the pressure above the resistance element, i.e. in the space enclosed by outer jacket 5, can be adjusted in advance as required.

The stated pressure must be high enough so that the light fraction is discharged through the discharge channel in the swirl element and low enough to prevent the liquid level in the inlet cyclone becoming too high, for instance beyond the underside of inner jacket 20, so chat light fraction can no longer be discharged.

In an alternative embodiment (not shown) a resistance element is embodied as a counter-swirl element, whereby in similar manner as described with reference to the counter-swirl element in the discharge channel the pressure drop can be decreased. In this embodiment the pressure in the space enclosed by inner jacket 5 can be adjusted by a predetermined correct dimensioning of the swirling blades, the curvature of the swirling blades, the number of swirling blades and so on.

In another embodiment (not shown) the supply tube t comprises a tangential inlet in inlet cyclone 1, i.e. the mixture entering inlet cyclone 1 already has a swirling movement. The swirling blades 25 for setting the mixture into a swirling movement can hereby be dispensed with.

All components of inlet cyclone 1 are formed and have small dimensions, for instance a maximum length or width of 1.5 m, such that they can be arranged in vessel S through manhole M (FIG. 1). The possibility is hereby created of arranging inlet cyclone 1 in processing vessel S at any random stage. The operation of for instance separating vessels S already in use can thus be improved by later incorporating therein one or more inlet cyclones according to the invention.

In addition to the use of the invention on inlet cyclones in a gravity separator, many alternative applications can be realized which are all deemed to lie within the scope of the invention. It is for instance possible to incorporate a cyclone into an offshore pipeline, wherein the fluid flow supplied through the pipeline is separated into a number of different fluid phases. It is also necessary in these alternative applications to avoid at all times the occurrence of a so-called "gas blowby", i.e. the exit of gas from the liquid outlet. If this takes place, the operation of the cyclone changes considerably: emulsion formation in the liquid phase or foam-forming in the liquid phase then result in a complete breakdown of the whole separator.

According to the invention all design parameters can be integrally optimized (inlet and both outlets), so that no high pressure drops need occur, which high pressure drops can cause emulsification of the liquid phase. Stated more generally, the pressure balance over the gas/liquid surface in a rotating gas/liquid mixture can be predicted according to the invention such that the location of the gas/liquid surface can be adjusted as a function of throughput of the mixture, composition of the mixture, degree of rotation of the mixture and the pressure drop over both outlets. Thus can be achieved chat the liquid phase and gas phase flow out of the outlets intended for that purpose. The adjustment of the position of the surface takes place with rings of blades (which are situated either in the inlet section whereby the degree of rotation is determined, or in the gas outlet whereby the pressure drop over the gas outlet section can be adjusted, or in a random combination of these locations).

The degree of rotation of the mixture is determined by providing the blades in the ring of blades in the inlet with a greater or smaller pitch. The stronger this rotation, the more the gas core in the mixture will tend to "creep" downward where it is precisely the liquid outlet which is situated. Conversely, by arranging counter-blades in the liquid outlet not only is this rotation limited, but the pressure is also regained, which is exactly what can result in increased "gas-carryunder", i.e. gas slipping through in the liquid outlet. This can in turn be prevented by doing the same in the gas outlet, where counter-blades can in principle realize a pressure recovery of the same order of magnitude and compensate the pressure build-up in the bottom of the cyclone with a comparable pressure build-up in the top of the cyclone. Thus is then achieved that the gas-liquid surface is held in the cyclone. This is a complicated design procedure which can only be performed successfully with high-pressure flow models specifically validated in this field.

The present invention is not limited to the above described preferred embodiments thereof; the rights sought are defined by the following claims, within the scope of which many modifications can be envisaged.

What is claimed is:

1. An inlet device for separating a mixture of gas with liquid and/or solids and configured for fluid communication with a gravity separation vessel, the inlet device comprising:
    an inlet for a supply of the mixture to be separated;
    a first and second outlet opening configured for a discharge of respectively a first mixture part and a second mixture part into a space of the gravity separation vessel;
    a flow body arranged substantially concentrically in the inlet device and provided with one or more swirl elements for setting the supplied mixture into swirling movement;
    a discharge channel for discharging the first mixture part to the first outlet opening, which discharge channel is arranged substantially through an interior of the flow body and extends from a downstream side of the flow body to the first outlet opening;
    a first resistance element with a predetermined flow resistance arranged between the second outlet opening and the flow body; and/or
    a second resistance element with a predetermined flow resistance, arranged in the discharge channel, downstream of which the first outlet opening is arranged.

2. The device as claimed in claim 1, wherein the first resistance element includes one or more counter-swirl elements for reducing the swirling movement of the first mixture part flowing thereamong.

3. The device as claimed in claim 1, wherein the second resistance element includes one or more counter-swirl elements for reducing the swirling movement of the second mixture part flowing thereamong.

4. The device as claimed in claim 1, wherein the second resistance element includes a central core, on a top side of which is mounted a conical component which becomes wider in a flow direction.

5. The device as claimed in claim 4, wherein flat plates are provided for limiting a rotation of the mixture part flowing thereamong.

6. The device as claimed in claim 1, wherein the inlet opening of the inlet device is provided with means for feeding in the mixture for separating at an increased tangential speed.

7. The device as claimed in claim 1, including a perforated plate placed close to the second outlet opening and downstream thereof for ensuring a substantially uniform velocity profile on a downstream side thereof.

8. The device as claimed in claim 1, wherein a swirl element includes one or more swirling blades, wherein the swirling blades are formed for setting into swirling movement or at least increasing the swirling movement of the mixture or mixture part flowing thereamong.

9. The device as claimed in claim 1, wherein a counter-swirl element includes one or more swirling blades, wherein the swirling blades are formed for decreasing the swirling movement of the mixture or mixture part flowing thereamong.

10. The device as claimed in claim 9, wherein an angle between a longitudinal direction of the inlet device and a swirling blade amount to between approximately 0 and 80 degrees.

11. The device as claimed in claim 9, wherein the swirling blades are curved.

12. The device as claimed in claim 1, wherein the inlet device includes an inner jacket which includes a conically tapering part in a flow direction.

13. The device as claimed in claim 12, wherein the conically tapering part is positioned between the swirl element and the resistance element.

14. The device as claimed in claim 1, wherein the first mixture part is formed by a light fraction, while the second mixture part is formed by a heavy fraction.

15. The device as claimed in claim 14, wherein the light fraction includes one or more gases and the heavy fraction includes one or more liquids.

16. The device as claimed in claim 14, wherein the light fraction comprises natural gas and the heavy fraction comprises oil and water.

17. The device as claimed in claim 1, wherein the first mixture part includes approximately 1% by volume of water and/or solids and the second mixture part includes at least approximately 95% by volume of liquid and/or solids.

18. The device as claimed in claim 1, wherein components of the processing vessel are embodied such that they can be fed through a manhole into a gravity separation vessel.

19. The device as claimed in claim 18, wherein a greatest dimension of a component amounts to a maximum of approximately 150 cm.

20. A device for separating a mixture of gas with liquid and/or solids, comprising:
  a gravity separation vessel which is provided with an inlet for a supply of the mixture;
  a processing vessel including:
    an inlet for a supply of the mixture to be separated;
    a first and second outlet opening for a discharge of respectively a first mixture part and a second mixture part into a space of a further vessel;
    a flow body arranged substantially concentrically in the processing vessel and provided with one or more swirl elements for setting the supplied mixture into swirling movement;
    a discharge channel for discharging the first mixture part to the first outlet opening, which discharge channel is arranged substantially through an interior of the flow body and extends from a downstream side of the flow body to the first outlet opening;
    a first resistance element with a predetermined flow resistance arranged between the second outlet opening and the flow body; and/or
    a second resistance element with a predetermined flow resistance, arranged in the discharge channel, downstream of which the first outlet opening is arranged, the processing vessel can be mounted in the gravity separation vessel with the inlet connected to the inlet of the gravity separation vessel, wherein the first and second outlet openings of the processing vessel are arranged for the discharge of the first mixture part and the second mixture part into a space of the gravity separation vessel for further separation of the second mixture part.

21. The device as claimed in claim 20, wherein the second outlet of the processing vessel is placed at least partially in the second mixture part situated in the space so as to keep an open connection between the processing vessel and said space inside the separation vessel.

22. A method for treating a mixture of gas with liquid and/or solids, comprising the step of sending the mixture into a processing vessel for separating a mixture of gas with liquid and/or solids, the processing vessel comprising:
  an inlet for a supply of the mixture to be separated;
  a first and second outlet opening for a discharge of respectively a first mixture part and a second mixture part into a space of a further vessel;
  a flow body arranged substantially concentrically in the processing vessel and provided with one or more swirl elements for setting the supplied mixture into swirling movement;
  a discharge channel for discharging the first mixture part to the first outlet opening, which discharge channel is arranged substantially through an interior of the flow body and extends from a downstream side of the flow body to the first outlet opening;
  a first resistance element with a predetermined flow resistance arranged between the second outlet opening and the flow body; and/or
  a second resistance element with a predetermined flow resistance, arranged in the discharge channel, downstream of which the first outlet opening is arranged; and
  wherein the processing vessel can be mounted in a gravity separation vessel with the inlet connected to the inlet of the gravity separation vessel, and
  wherein the first and second outlet openings of the processing vessel are arranged for the discharge of the first mixture part and the second mixture part into a space of the gravity separation vessel for further separation of the second mixture part.

23. A method for designing a device for separating a mixture into a light and heavy fraction, comprising the step of designing components of a an inlet device such that the components can be fed through a manhole into a gravity separation vessel, wherein the inlet device comprises an inlet for the mixture, a first outlet for the light fraction and a second outlet for the heavy fraction, the first and second outlet in fluid communication with the gravity separation vessel and a rotation means for setting the mixture into rotation, wherein swirl elements arranged close to the inlet and/or counter-swirl elements arranged close to the first and second outlet are provided with swirling blades dimensioned such that through the desired degree of rotation a preselected pressure is available whereby the boundary surface between the heavy and light fraction extends on a preselected level within the inlet device.

* * * * *

UNITED STATES PATENT AND TRADEMARK OFFICE
CERTIFICATE OF CORRECTION

PATENT NO.   : 6,702,877 B1
DATED        : March 9, 2004
INVENTOR(S)  : Rombout Adriaan Swanborn It is certified that error appears in the above-identified patent and that said Letters Patent is hereby corrected as shown below:

Title page, Item [54] and Column 1, lines 1-3,
Title, "APPARATUS AND METHOD FOR PROCESSING OF A MIXTURE OF GAS WITH LIQUID AND/OR SOLID MATERIAL" should read -- DEVICE FOR SEPARATING A MIXTURE OF GAS WITH LIQUID AND/OR SOLID MATERIAL --

Title page,
Item [22], PCT Filed, "May 6, 2000" should read -- June 5, 2000 --

Signed and Sealed this

Twenty-third Day of November, 2004

JON W. DUDAS
*Director of the United States Patent and Trademark Office*

(12) EX PARTE REEXAMINATION CERTIFICATE (5629th)
United States Patent
Swanborn (10) Number: US 6,702,877 C1
(45) Certificate Issued: Dec. 5, 2006

(54) DEVICE FOR SEPARATING A MIXTURE OF GAS WITH LIQUID AND/OR SOLID MATERIAL

(75) Inventor: Rombout Adriaan Swanborn, Arnhem (NL)

(73) Assignee: Spark Technologies and Innovations N.V., Curacao (AN)

Reexamination Request:
No. 90/007,409, Feb. 3, 2005

Reexamination Certificate for:
Patent No.: 6,702,877
Issued: Mar. 9, 2004
Appl. No.: 10/009,105
Filed: May 6, 2002

Certificate of Correction issued Nov. 23, 2004.

(22) PCT Filed: Jun. 5, 2000

(86) PCT No.: PCT/NL00/00382

§ 371 (c)(1),
(2), (4) Date: May 6, 2002

(87) PCT Pub. No.: WO00/74815

PCT Pub. Date: Dec. 14, 2000

(30) Foreign Application Priority Data

Jun. 4, 1999 (NL) .............................. 1012245

(51) Int. Cl.
*B01D 45/12* (2006.01)

(52) U.S. Cl. .............................. 95/269; 55/416; 55/421; 55/428; 55/457; 96/189

(58) Field of Classification Search ...................... None
See application file for complete search history.

(56) References Cited

U.S. PATENT DOCUMENTS

| | | | |
|---|---|---|---|
| 2,378,632 A | 6/1945 | Hooker et al. | |
| 3,212,232 A | 10/1965 | McMinn | |
| 5,466,372 A | 11/1995 | Jerabek et al. | |
| 6,190,543 B1 | 2/2001 | Christiansen | |
| 6,409,808 B1 | 6/2002 | Chamberlain et al. | |

FOREIGN PATENT DOCUMENTS

WO 96/06683 3/1996

OTHER PUBLICATIONS

Advanced Production Technologies & Systems, SPE Applied Technology Workshop, May 1998, printed publication of presentation by R. Swanborn, CDS Engineering.

Gulbraar et al, Latest experiences from adopting G–Sep. CCI (Compact Cyclone Inlet) to Statfjord B separators, $5^{th}$ Annual Production Separation Forum, IBC UK Conferences Ltd., May 27–28, 1998, Oslo, Norway.

Christiansen et al, Centrifugal Wellstream Separation of Water and Sand, SPE Asia Pacific Oil & Gas Conf., Mar. 20–22, 1995. Kuala Lumpur, Malaysia.

*Primary Examiner*—Jerry D. Johnson (57) ABSTRACT

Disclosed device for separating a mixture of gas with liquid and/or solid, which comprises a gravity separation vessel and a processing vessel which can be mounted in the gravity separation vessel. The processing vessel comprises a flow body which is provided with one or more swirl elements which set the feed mixture into rotation. The processing vessel also comprises a resistance element which is positioned between an outlet for the heavier fraction of the mixture and the flow body. The processing vessel may also comprise counter-swirl elements which are positioned in the discharge channel for the lighter fraction of the mixture.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–23 are cancelled.

* * * * *